Patented Aug. 29, 1944

2,356,789

UNITED STATES PATENT OFFICE 2,356,789

VARNISH

Matthew Holzmer, Cleveland, and Theodore A. Neuhaus, Lakewood, Ohio, assignors to The Glidden Company, Cleveland, Ohio, a corporation of Ohio No Drawing. Application December 30, 1940, Serial No. 372,344

3 Claims. (Cl. 260—25)

The present invention relates to varnishes, and particularly to a mixing varnish.

There have recently appeared on the market resins, which because of their toughness and wear-resistance have attracted considerable interest as film-forming materials for varnishes and other coating compositions, particularly in the insulation of copper wire. Among these resins may be mentioned polyvinyl acetal resins of the character described in United States Patent to Morrison No. 2,036,092 and modifications thereof, such as the product sold by Shawinigan Chemicals Ltd. under the trade-mark "Formvar," etc. This type of resin has been recognized as possessing excellent insulating properties, and also to possess toughness and wear-resistance in the form of coated films. Nylon is another resin which possesses similar desirable properties.

These resins, however, possess certain undesirable properties. The water resistance is not too good and in the case of nylon the life of the films is rather short. Another disadvantage is that these resins produce a high viscosity in solution, which necessitates either the use of a die application where viscous solutions are employed, or if immersion application of thinner solutions is employed, the solids content is so low that the number of applications required to build up the desired thickness of film is greatly increased.

Attempts have been made to incorporate other film-forming bodies with the aforementioned resins but so far as is known this has not heretofore proven successful due to the incompatibility of most other resins with solutions of the polyvinyl acetal resins and nylon.

It has been found, however, that a varnish comprising a combination of resins in a mutual solvent may be employed to lessen the aforementioned difficulties.

It has been found that a solution of an unmodified heat-hardenable phenol-formaldehyde resin and methyl abietate in a mutual solvent comprising a phenol solvent is compatible with polyvinyl acetal resins and nylon, and may be mixed with such resins or solutions thereof to form improved coating compositions.

Phenol-formaldehyde resins found suitable are unmodified heat-hardenable phenol and cresol formaldehyde resins in which the formaldehyde is reacted in equimolecular proportion to or somewhat in excess of the phenol in the presence of an alkaline catalyst. Such resins are preferably incorporated in the form of solutions in alcohol solvents, which may be prepared in accordance with United States Patent No. 1,037,719. Oil modified phenol formaldehyde resins have not been found to be compatible with either nylon or the vinyl acetal resins.

Ethyl abietate may be used in place of methyl abietate.

Any phenolic solvent may be used. Ordinarily they will be selected to give the desired evaporation rate, depending partly upon the conditions employed in baking or drying the coating. Also diluents and thinners may be employed so long as they do not cause precipitation of the solids in the mixing varnish or of the final coating composition.

*Example I*

50 parts of a varnish prepared according to United States Patent No. 1,037,719 containing 70% of resin of the type described above and 25 parts of methyl abietate were dissolved in 1475 parts of a mixture consisting of 30% U. S. P. cresol and 70% coal tar naphtha. In this varnish was then dissolved 75 parts of "Formvar 15/95." The resulting enamel was then applied to copper wire by the immersion method and baked at about 500° F., the process being repeated a sufficient number of times to give the desired thickness of coating. The viscosity of the final solution was no greater than that produced when the same amount of the acetal resin was dissolved in the same amount of the solvent mixture, although the total solids content was much higher, and fewer coats were necessary to give the desired thickness of coating. The water resistance was greatly improved.

*Example II*

8 parts of the same varnish solution employed in Example I and 4 parts of methyl abietate were dissolved in 80 parts of U. S. P. cresol. 20 parts of nylon flakes were then dissolved in the mixing varnish. The resulting enamel was then applied to copper wire by the die method and baked. The viscosity was the same as that of a 20% solution of nylon in the cresol, although the total solids content was greatly increased. The baked coating showed improvement in water-resistance and possessed a much longer life than the straight nylon coating. The nylon may be first dissolved in a portion of the solvent and the mixing varnish added thereto, if desired, particularly where the immersion method of application is to be employed.

The amounts of the phenolic resin and abietate may vary, but preferably neither one will predominate over the other to an extent which would destroy the properties attributable to the minor ingredient. Thus both ingredients are preferably present in substantial amounts.

Having described the invention what is claimed is:

1. A mixing varnish consisting essentially of a solution of an unmodified heat-hardenable phenol-formaldehyde resin and a resin selected from the class of methyl and ethyl abietates in a mutual solvent comprising a phenol.

2. A mixing varnish consisting essentially of an unmodified heat-hardenable phenol-formaldehyde resin and methyl abietate dissolved in a mutual solvent comprising a phenol.

3. A mixing varnish consisting essentially of an unmodified heat-hardenable phenol-formaldehyde resin and methyl abietate, both in substantial proportions, and dissolved in a mutual solvent comprising a phenol.

MATTHEW HOLZMER.
THEODORE A. NEUHAUS.